No. 806,569. PATENTED DEC. 5, 1905.
W. J. REID.
METHOD OF MANUFACTURING LUBRICANT RECEIVING DEVICES FOR DRIVEN PARTS.
APPLICATION FILED MAR. 7, 1905.
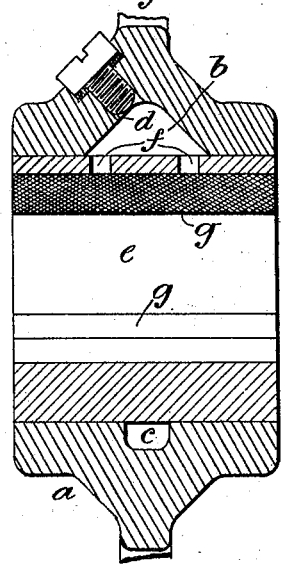
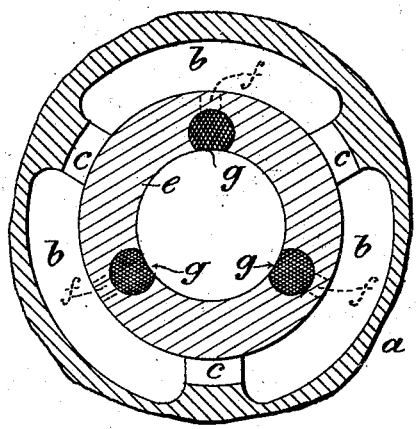
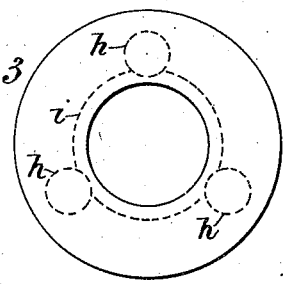
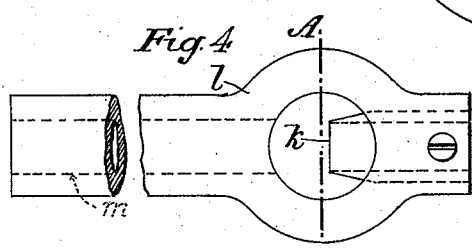
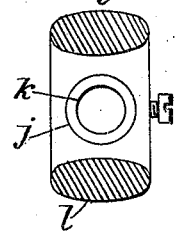
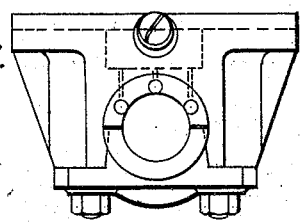
Witnesses:—
Inventor
William J. Reid
By James L. Norris
Atty

UNITED STATES PATENT OFFICE.

WILLIAM JAMES REID, OF WOODSIDE PARK, ENGLAND.

METHOD OF MANUFACTURING LUBRICANT-RECEIVING DEVICES FOR DRIVEN PARTS.

No. 806,569. Specification of Letters Patent. Patented Dec. 5, 1905.

Application filed March 7, 1905. Serial No. 248,804.

*To all whom it may concern:*

Be it known that I, WILLIAM JAMES REID, a subject of the King of Great Britain, residing at Woodside Park, in the county of Middlesex, England, have invented new and useful Improvements in Methods of Manufacturing Lubricant-Receiving Devices for Driven Parts, of which the following is a specification.

This invention relates to the manufacture or production of certain portions of lubricant-receiving devices of a particular type for automatically effecting lubrication of rotary bearing parts of mechanism—such as sheaves, pulleys, and other wheels designed for rotation on shafts or axles and bearings for reception of rotatory shafts and axles—the particular type referred to being that in which a receptacle for oil is made in a part of the mechanism and packing to which the oil is free to pass is contained in grooves nearly circular in cross-section and parallel to the axis of the shaft or axle and formed in a part contiguous to the bearing-surface, so that the said packing is in contact with the bearing-surface to which the oil absorbed by and percolating the packing consequently passes.

The said invention consists of the novel method of production and packing of the said grooves hereinafter described with reference to the accompanying drawings by which method formation and packing of the said grooves are effected with great perfection and rapidity and with exercise of considerably less skill and care than are needed where the grooves are produced and packed by the methods heretofore known. According to the present invention the said packed grooves are produced by drilling circular holes at the required parts of the wheels or rotary parts or bearings and inserting in the said holes cylindrical pieces of leather of such size as to fit them tightly and subsequently removing by turning, boring, or drilling portions of the metal in which they have been formed, together with portions of the packing therein, so as to convert the packed holes into grooves having the shape of troughs with contracted mouths and having in transverse section the figure of an arc of a circle greater than a semicircle and by the same operation to shape the packing in the said holes as required to provide for proper fitting of the exposed portion thereof on the bearing part to be lubricated.

The said invention is further described with reference to the accompanying drawings, Figures 1 and 2 of which are sections taken at right angles to each other, illustrating the hub and proximate parts of a bushed pulley furnished with means for automatic lubrication of the type or general character hereinbefore described comprising packed grooves produced according to the said invention. Fig. 3 is a separate end view of the bush of the said pulley at a certain stage of its manufacture. Fig. 4 is a side view of an instrument specially designed for cutting leather to the shape required according to this invention; and Fig. 5 is a section of the said instrument, taken on the line A, Fig. 4. Fig. 6 illustrates a bearing for a truck-axle provided with packing-grooves produced according to the said invention.

Referring to Figs. 1 and 2, $a$ is the hub, and $b\ b$ are chambers for reception of the oil for lubrication, which chambers are connected by passages $c\ c$. $d$ is the passage for introduction of the lubricant, and $e$ is the bush, which fits the hub and is secured therein as usual. $f\ f$ are passages forming communications between the oil-chambers $b\ b$ and the aforesaid grooves, which are filled with leather packing $g\ g$.

All the aforesaid parts are formed and produced in the ordinary manner, with the exception of the said packed grooves, which are produced as hereinafter particularly described with reference to Fig. 3 and partly by use of the special instrument hereinbefore referred to. The said Fig. 3 illustrates in end view a plain hollow cylindrical casting turned externally to the size required to fit the central hollow of the pulley-hub $a$ and having the aforesaid passages $f\ f$ formed in it, the bore or interior of the said casting being still in the rough state. In this casting grooves of the sectional shape of those occupied by the leather packings (illustrated at $g\ g$ in Fig. 2) are produced according to this invention and packed with leather in the following manner: Parallel with and equidistant from the axis of the cylinder circular holes are drilled, as indicated by the broken lines $h\ h$, the said holes extending completely through the walls of the cylinder from end to end, the radial positions of the said holes being such that a disk of the diameter of the shaft which the bush is to fit will when placed concentrically on the end of the bush cover a portion of the metal in which the holes are drilled equal to about one-fourth their circumference, as indicated by the broken-line circle $i$, Fig. 3. Into each of the said holes a portion of a thong of leather of cylindrical shape—*i. e.*, circular in transverse section—and of slightly greater diameter than the said holes is then forced, so as to completely fill each of them from end to end, and on this being accomplished the interior of the casting is by drilling or boring or turning or otherwise sufficiently enlarged to properly fit the pulley-shaft, the effect of which operation is to open communications between the leather-packed holes and the shaft bore or hollow of the bush and at the same time to cut away those portions of the leather packing which lie within the radius of the shaft-bore, the cut faces so produced of the leather packing thus forming portions of the cylindrical interior of the bush, which is then ready for insertion in the pulley-hub.

The leather for the packings $g$ $g$ may be conveniently shaped, as required by use of the instrument illustrated in Figs. 4 and 5, which instrument consists of a steel tube $j$, having at one end a cutting edge $k$ and secured in a stock $l$, a tubular portion $m$ of which acts as a guide for the leather when the instrument is in use. In preparing thongs for the said packings with the aid of the said instrument strips approximately square in section are cut from a hide somewhat thicker than the required diameter of the thongs, and one end of each of such strips is reduced sufficiently to permit of its passage through the cutter-tube $j$, and the end so reduced is passed through the tubular guide $m$ of the aforesaid instrument and thence through the said cutter-tube. The projecting end is then gripped and the whole strip drawn through the said instrument, and thereby shaped as required. By this means packings for use according to this invention may be readily cut clear of the hard outer surface of the hide, which is less porous and absorbent than the inner part and the presence of which on the packings is therefore objectionable. The kind of leather preferred is oak-tanned leather, such as is known in commerce as "oil-leather" or "hydraulic leather;" but other kinds of leather are suitable.

The method of production hereinbefore described of lubricating packed grooves of the type hereinbefore described, and illustrated in the accompanying drawings, is applicable in the manner hereinbefore described to the production of such packed grooves generally, whether they be formed in solid or split bushes or in bushes constituting rotary or stationary bearing parts or in bearings not provided with separable bushes—such, for instance, as axle-bearings for trucks, a bearing of which kind provided with such packed grooves is illustrated in side view in Fig. 6 of the accompanying drawings.

Having now particularly described and ascertained the nature of the said invention and in what manner the same is to be performed, I declare that what I claim is—

A method of manufacturing a lubricant-receiving device consisting in providing a hollow rotating member with cylindrical openings parallel with the axis thereof, inserting thongs of leather in the said openings so as to completely fill the same, and then boring away the inner face of said member throughout so as to expose the said leather and thereby form the member with a composite inner face.

In testimony whereof I have signed my name to this specification in the presence of two subscribing witnesses.

WILLIAM JAMES REID.

Witnesses:
   H. D. JAMESON,
   A. NUTTING.